N. KLOTZ.
ROLLER FOR SLIDING DOORS.
APPLICATION FILED AUG. 10, 1910.
988,880.
Patented Apr. 4, 1911.
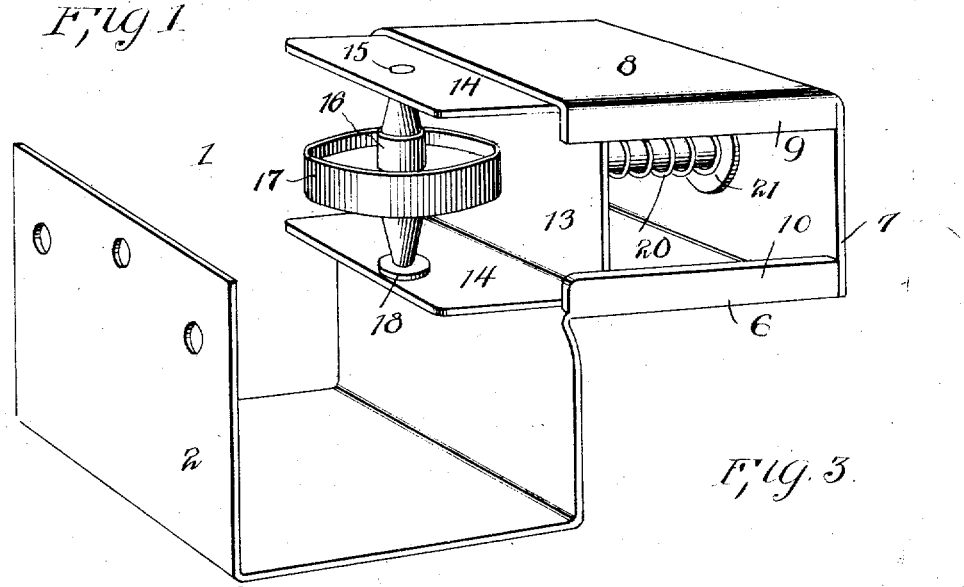
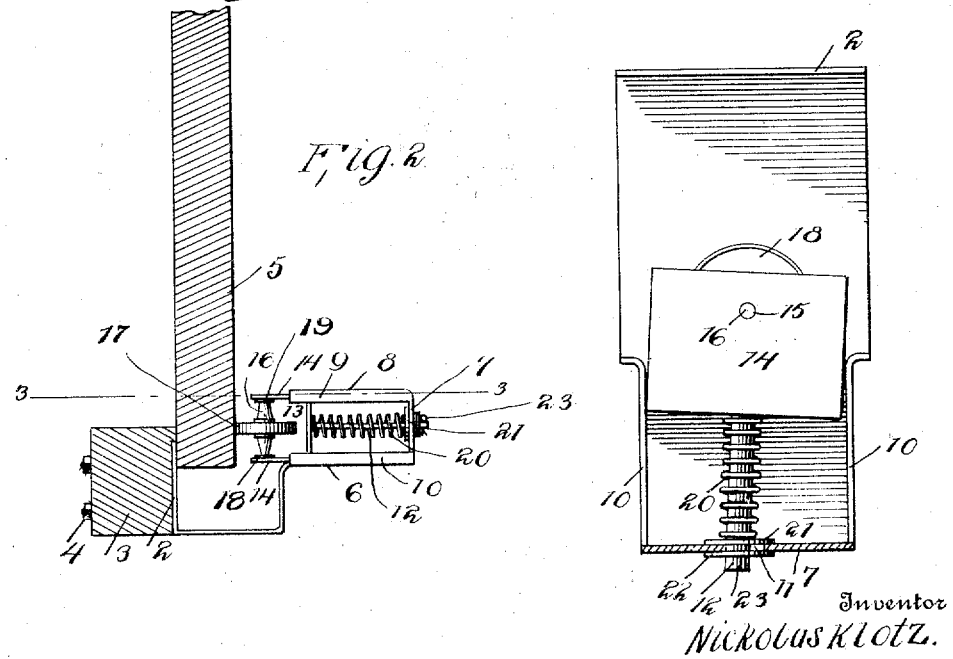
Witnesses
William Smith
James A. Koehl
Inventor
Nickolus Klotz.
By Victor J. Evans
Attorney

UNITED STATES PATENT OFFICE.

NICKOLAS KLOTZ, OF NIAGARA, NORTH DAKOTA, ASSIGNOR OF ONE-HALF TO JAMES H. MAGORIS, OF LARIMORE, NORTH DAKOTA.

ROLLER FOR SLIDING DOORS.

988,880.  Specification of Letters Patent.  Patented Apr. 4, 1911.

Application filed August 10, 1910.  Serial No. 576,487.

*To all whom it may concern:*

Be it known that I, NICKOLAS KLOTZ, a citizen of the United States of America, residing at Niagara, in the county of Grand Forks and State of North Dakota, have invented new and useful Improvements in Rollers for Sliding Doors, of which the following is a specification.

This invention relates to stay rollers for sliding doors and particularly to a roller which is designed to engage the lower portion of the door so as to hold the door in close contact with the casing, the object of the invention being to employ a novel and effective bracket for yieldingly and slidably supporting the roller.

In the drawing, forming a portion of this specification and in which like numerals of reference indicate similar parts in the several views:—Figure 1 is a perspective view of my improved roller. Fig. 2 is a detail vertical section through a portion of a sliding door showing the application of the roller thereto. Fig. 3 is a horizontal section taken on the line 3—3 of Fig. 2.

The invention is designed particularly for use in connection with sliding barn doors or the like, and it consists of a bracket 1 which is formed to provide a vertical apertured flange 2 which is attached to the sill or casing portion 3 of the barn or inclosure by bolts 4. From the flange 2 the bracket extends forwardly beneath the sliding door 5 and then upwardly in parallel relation to the part 2 and then outwardly to form a horizontal base 6. The base 6 has its outer extremity extended upwardly, as shown at 7, and then forwardly, as shown at 8, the said portion 8 being disposed immediately above the base 6. The side edges of the portion 8 are formed to provide depending guide flanges 9 and the side edges of the base 6 are formed to provide upstanding guide flanges 10.

The portion 7 of the bracket is formed to provide a passage 11 through which the stem 12 of the sliding roller support 13 extends. The sliding roller support moves on the base 6, and as illustrated, such support consists of a substantially U-shaped member whose arms 14 are formed to provide bearings 15 in which the ends of the axle 16 of the roller 17 are mounted. The axle 16 is provided with a lower washer 18 and an upper washer 19. These washers are designed to engage the arms 14 of the support 13 to prevent the roller 17 from contacting therewith. It may be stated that the opening 11 is somewhat larger than the diameter of the stem 12 and that the support 13 is mounted on the bracket 1 for slight lateral movements to allow for any sudden thrust thereof in one direction or the other against the roller. The flanges 10 while being designed to guide the support 13 in its movement also serve to prevent the strain from being applied entirely to the axle of the roller and to the stem 12. To hold the roller 17 normally in an extended position to cause the same to bear against the door to hold the door securely closed against the inclosure, I provide a relatively strong spring 20 which is coiled around the stem 12 and confined between the support 13 and the washer 21, as clearly shown in Fig. 2 of the drawing. The washer 21 is located on the inner side of the upstanding part 7 of the bracket and as illustrated, the washer 22 bears against the outer side of the upstanding part 7. The last named washer is adapted to be engaged by the removable cotter pin 23. The pin extends through an aperture near the outer extremity of the stem 12, its office being to limit the movement of the support 14 in one direction.

The device when mounted as hereinbefore described will accommodate any irregularities of the surface of the door and will obviate the door becoming bound should snow or ice accumulate thereon.

I claim:—

A bracket having an enlarged opening in its rear face, a slidably mounted support on the bracket, a roller on the support, a stem extending from the support and having its opposite end extending through the said opening to permit horizontal lateral movement of the support on the bracket, guide flanges formed on the bracket for engaging the support to limit the horizontal sliding movement thereof, and a spring extending around the stem and confined between the bracket and support respectively to hold the support normally extended on the bracket.

In testimony whereof I affix my signature in presence of two witnesses.

NICKOLAS KLOTZ.

Witnesses:
   Chas. H. Bobb,
   H. S. Link.